United States Patent
Zhang

(10) Patent No.: US 10,064,094 B2
(45) Date of Patent: *Aug. 28, 2018

(54) NULL DATA PACKET FORMAT FOR LONG RANGE WLAN

(71) Applicant: Marvell World Trade Ltd., St. Michael (BB)

(72) Inventor: Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 1 day.

This patent is subject to a terminal disclaimer.

(21) Appl. No.: 15/483,437

(22) Filed: Apr. 10, 2017

(65) Prior Publication Data

US 2017/0215104 A1 Jul. 27, 2017

Related U.S. Application Data

(63) Continuation of application No. 14/612,176, filed on Feb. 2, 2015, now Pat. No. 9,621,322, which is a (Continued)

(51) Int. Cl.
*H04K 1/10* (2006.01)
*H04W 28/06* (2009.01)
(Continued)

(52) U.S. Cl.
CPC ......... *H04W 28/065* (2013.01); *H04L 5/0048* (2013.01); *H04L 5/0053* (2013.01);
(Continued)

(58) Field of Classification Search
CPC . H04W 28/065; H04W 72/046; H04W 88/06; H04W 84/12; H04W 72/04;
(Continued)

(56) References Cited

U.S. PATENT DOCUMENTS 7,599,332 B2   10/2009  Zelst et al.
7,742,390 B2    6/2010  Mujtaba
(Continued)

FOREIGN PATENT DOCUMENTS

CN    1998175 A    7/2007
CN    101479958 A   7/2009
(Continued)

OTHER PUBLICATIONS

International Standard, ISO/IEC 8802-11, ANSI/IEEE Std 802.11, "Information technology—Telecommunications and information exchange between systems—local and metropolitan area networks—specific requirements" Part 11: Wireless LAN Medium Access Control (MAC) and Physical Layer (PHY) specifications, *The Institute of Electrical and Electronics Engineers, Inc.*, pp. 1-512 (1999).

(Continued)

*Primary Examiner* — Dhaval Patel

(57) ABSTRACT

A communication device determines a physical layer (PHY) mode according to which a null data packet (NDP) is to be transmitted, the determined PHY mode from a set of PHY modes defined by a communication protocol, the set of PHY modes including i) a first PHY mode and ii) a second PHY mode. When it is determined that the NDP is to be transmitted according to the first PHY mode, the communication device generates the NDP according to a first PHY format, including generating a PHY preamble of the NDP according to a first preamble format. When it is determined that the NDP is to be transmitted according to the second PHY mode, the communication device generates the NDP according to a second PHY format, including generating the PHY preamble of the NDP according to a second preamble format; and transmitting the NDP with the communication device.

27 Claims, 12 Drawing Sheets

Related U.S. Application Data continuation of application No. 13/477,920, filed on May 22, 2012, now Pat. No. 8,948,283.

(60) Provisional application No. 61/494,349, filed on Jun. 7, 2011, provisional application No. 61/490,465, filed on May 26, 2011.

(51) Int. Cl.
*H04L 5/00* (2006.01)
*H04L 27/26* (2006.01)
*H04L 29/06* (2006.01)
*H04W 84/12* (2009.01)
*H04W 72/04* (2009.01)
*H04W 88/06* (2009.01)

(52) U.S. Cl.
CPC .......... *H04L 27/2627* (2013.01); *H04L 69/22* (2013.01); *H04W 72/046* (2013.01); *H04W 84/12* (2013.01); *H04W 88/06* (2013.01)

(58) Field of Classification Search
CPC ... H04L 5/0053; H04L 5/0007; H04L 5/0044; H04L 5/0048; H04L 69/04; H04L 25/0224; H04L 5/005; H04L 69/22; H04L 69/323; H04L 1/0004; H04L 2025/03414; H04L 25/0204; H04B 7/0417
USPC ............... 375/260, 262, 265, 295, 296, 316; 370/203, 204, 208, 209
See application file for complete search history.

(56) References Cited

U.S. PATENT DOCUMENTS

| | | | |
|---|---|---|---|
| 8,144,647 B2 | 3/2012 | Nabar et al. | |
| 8,270,909 B2 | 9/2012 | Zhang et al. | |
| 8,289,869 B2 | 10/2012 | Sawai | |
| 8,339,978 B2 | 12/2012 | Sawai et al. | |
| 8,462,863 B1 | 6/2013 | Zhang et al. | |
| 8,498,362 B2 | 7/2013 | Zhang et al. | |
| 8,526,351 B2 | 9/2013 | Fischer et al. | |
| 8,542,589 B2 | 9/2013 | Surineni et al. | |
| 8,599,804 B2 | 12/2013 | Erceg et al. | |
| 8,619,907 B2 | 12/2013 | Mujtaba et al. | |
| 8,724,720 B2 | 5/2014 | Srinivasa et al. | |
| 8,787,841 B2 | 7/2014 | Ketchum et al. | |
| 8,867,653 B2 | 10/2014 | Zhang et al. | |
| 8,948,283 B2 | 2/2015 | Zhang | |
| 9,621,322 B2 * | 4/2017 | Zhang | H04L 5/0048 |
| 2006/0018394 A1 | 1/2006 | van Zelst et al. | |
| 2007/0298742 A1 | 12/2007 | Ketchum et al. | |
| 2009/0196163 A1 | 8/2009 | Du | |
| 2010/0046656 A1 | 2/2010 | van Nee et al. | |
| 2010/0260159 A1 | 10/2010 | Zhang et al. | |
| 2011/0002219 A1 | 1/2011 | Kim et al. | |
| 2012/0039196 A1 | 2/2012 | Zhang | |
| 2012/0201316 A1 | 8/2012 | Zhang et al. | |
| 2012/0294294 A1 | 11/2012 | Zhang | |

FOREIGN PATENT DOCUMENTS

| | | |
|---|---|---|
| JP | 2009-543471 A | 12/2009 |
| WO | WO-2010/120692 | 10/2010 |
| WO | WO-2012/122119 | 9/2012 |

OTHER PUBLICATIONS

IEEE Std P802.11-REVma/06.0, (Revision of IEEE Std 802.11-1999) "Unapproved Draft Standard for Information Technology—Telecommunications and information exchange between systems—Local and metropolitan area network—Specific requirements Part 11: Wireless LAN Medium Access Control (MAC) and Physical Layer (PHY) specifications," (This document reflects the combining of the 2003 Edition of 802.11 plus the 802.11 g, 802.11 h, 802.11 i and 802.11j Amendments) (Superseded by P802.11-REVma_D7.0), pp. 1-1212 (2006).

IEEE Std 802.11-2007 (revision of IEEE Std. 802.11-1999) "Information Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., pp. 1-1184 (Jun. 12, 2007).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

IEEE Std 802.11a-1999 (R2003) (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," The Institute of Electrical and Electronics Engineers, Inc., pp. 1-92, (1999) Reaffirmed (Jun. 12, 2003).

IEEE Std 802.11a-1999 (Supplement to IEEE Std 802.11-1999) "Supplement to IEEE Standard for Information technology—Telecommunications and information exchange between systems—Local and metropolitan area networks—Specific requirements—Part 11: Wireless LAN Medium Access Control (MAC) and Physical Layer (PHY) specifications: High-Speed Physical Layer in the 5 GHz Band," *The Institute of Electrical and Electronics Engineers, Inc.*, pp. 1-83 (Sep. 1999).

IEEE Std 802.11ac/D2.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-359 (Jan. 2012).

IEEE Std 802.11ac/D2.1 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-363 (Mar. 2012).

IEEE Std 802.11af/D1.05 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE Std 802.11b-1999 (Supplement to ANSI/IEEE Std 802.11, 1999 Edition) "Supplement to IEEE Standard for Information technology—Telecommunications and information exchange between systems—Local and metropolitan area networks—Specific requirements Part 11: Wireless LAN Medium Access Control (MAC) and Physical Layer (PHY) specifications: Higher-speed Physical Layer Extension in the 2.4 GHz Band," *The Institute of Electrical and Electronics Engineers, Inc.*, pp. 1-89 (Sep. 1999).

IEEE Std 802.11b-1999/Cor 1-2001 (Corrigendum to IEEE Std 802.11b-1999) "IEEE Standard for Information technology—Telecommunications and information exchange between systems—Local and metropolitan area networks—Specific requirements, Part 11: Wireless LAN Medium Access Control (MAC) and Physical Layer (PHY) specifications, Amendment 2: Higher-speed Physical

(56) References Cited

OTHER PUBLICATIONS

Layer (PHY) extension in the 2.4 GHz band—Corrigendum 1," *The Institute of Electrical and Electronics Engineers, Inc.*, pp. 1-23 (Nov. 7, 2001).
IEEE Std 802.11g/D2.8, May 2002 (Supplement to ANSI/IEEE Std 802.11, 1999 Edition) "Draft Supplement to Standard [for] Information technology—Telecommunications and information exchange between systems—Local and metropolitan area networks—Specific requirements—Part 11: Wireless LAN Medium Access Control (MAC) and Physical Layer (PHY) specifications: Further Higher-Speed Physical Layer Extension in the 2.4 GHz Band," *The Institute of Electrical and Electronics Engineers, Inc.*, pp. 1-53 (May 2002).
IEEE Std 802.11g/D8.2, Apr. 2003 (Supplement to ANSI/IEEE Std 802.11, 1999 (Reaff 2003)) "Draft Supplement to Standard [for] Information technology—Telecommunications and information exchange between systems—Local and metropolitan area networks—Specific requirements, Part 11: Wireless LAN Medium Access Control (MAC) and Physical Layer (PHY) specifications: Further Higher Data Rate Extension in the 2.4 GHz Band," *The Institute of Electrical and Electronics Engineers, Inc.*, pp. 1-69 (Apr. 2003).
IEEE P802.11n™/D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," The Institute of Electrical and Electronics Engineers, Inc., pp. 1-544 (Sep. 2007).
IEEE Std. 802.11n™ "IEEE Standard for Information Technology—Telecommunications and information exchange between systems—Local and metropolitan area networks—Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
Chen et al., "IEEE P802.11, Wireless LANs, Proposed TGac Draft Amendment," *IEEE P802.11-10/1351r3*, 165 pages (Jan. 18, 2011).
Chen, "Home Network Basis: Transmission Environments and Wired/Wireless Protocols," Prentice Hall, pp. 1-26 (Jul. 2003).
de Vegt, "Potential Compromise for 802.11ah Use Case Document", Institute of Electrical and Electronics Engineers, doc. No. IEEE 802.11-11/0457r0, pp. 1-27 (Mar. 2011).
Gunnam, et al., "Multi-Rate Layered Decoder Architecture for Block LDPC Codes of the IEEE 802.11n Wireless Standard," IEEE International Symposium on Circuits and Systems, 2007 (ISCAS 2007), pp. 1645-1648 (2007).
Hiertz, et al., "The IEEE 802.11 Universe," *IEEE Communications Magazine*, pp. 62-70, (Jan. 2010).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Mujtaba, S.A. "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Park, "Proposed Specification Framework for TGah", *The Institute of Electrical and Electronics Engineers*, doc. No. IEEE 802.11—yy/xxxxr05, (Jan. 2012).
Park, "Proposed Specification Framework for TGah", *The Institute of Electrical and Electronics Engineers*, doc. No. IEEE 802.11-11/1137r6, pp. 1-13 (Mar. 2012).
Perahia et al., "Gigabit Wireless LANs: an overview of IEEE 802.11ac and 80211ad," ACM SIGMOBILE Mobile Computing and Communications Review, vo. 15, No. 3, pp. 23-33 (Jul. 2011).
Shi et al., "Phase Tracking During VHT-LTF," Doc. No. IEEE 802.11-10/0771r0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Syafei et al., "A Design of Next Generation Gigabit MIMO Wireless LAN System," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
van Nee et al. "The 802.11n MIMO-OFDM Standard for Wireless LAN and Beyond," Wireless Personal Communications, vol. 37, pp. 445-453 (Jun. 2006).
van Zelst et al., "Pilot Sequence for VHT-DATA," Doc. No. IEEE 802.11-10/0811r1, *The Institute of Electrical and Electronics Engineers, Inc.*, pp. 1-10 (Jul. 2010).
Vermani et al. "Preamble Format for 1 MHz," *The Institute of Electrical and Electronics Engineers*, doc. No. IEEE 802.11-11/1482r2, pp. 1-30 (Nov. 2011).
Vermani, et al. "Spec Framework Text for PHY Numerology," *The Institute of Electrical and Electronics Engineers*, doc. No. IEEE 802.11-11/1311r0, pp. 1-5 (Sep. 2011).
Yu et al., "Coverage extension for IEEE802.11ah," *The Institute of Electrical and Electronics Engineers*, doc. No. IEEE 802.11-11/0035r1 , pp. 1-10 (Jan. 2011).
Zhang et al., "11ac Explicit Sounding and Feedback", The Institute of Electrical and Electronics Engineers, doc. No. IEEE 802.11-10/1105r0, 44 pages (Sep. 2010).
Zhang et al., "11 ah Data Transmission Flow," *The Institute of Electrical and Electronics Engineers*, doc. No. IEEE 802.11-11/1484r1, pp. 1-15 (Nov. 2011).
Zhang et al., "1 MHz Waveform in Wider BW", *The Institute of Electrical and Electronics Engineers*, doc. No. IEEE 802.11-12/0309r1, pp. 1-10 (Mar. 2012).
Partial International Search report in International Application No. PCT/US2012/038976, dated Aug. 22, 2012.
International Search Report and Written Opinion in International Application No. PCT/US2012/038976, dated Apr. 18, 2013.
International Preliminary Report on Patentability in Application No. PCT/US2012/038976, dated Dec. 5, 2013.
Office Action in Japanese Application No. 2014-512946, dated Jan. 26, 2016, with English translation (6 pages).
First Office Action in Chinese Application No. 2012800357395, dated Jan. 27, 2016, with English translation (11 pages).
Second Office Action in Chinese Patent Application No. 2012800357395, dated Sep. 19, 2016, with English translation (16 pages).
Third Office Action in Chinese Patent Application No. 201280035739.5, dated Mar. 21, 2017, with English translation (8 pages).

\* cited by examiner

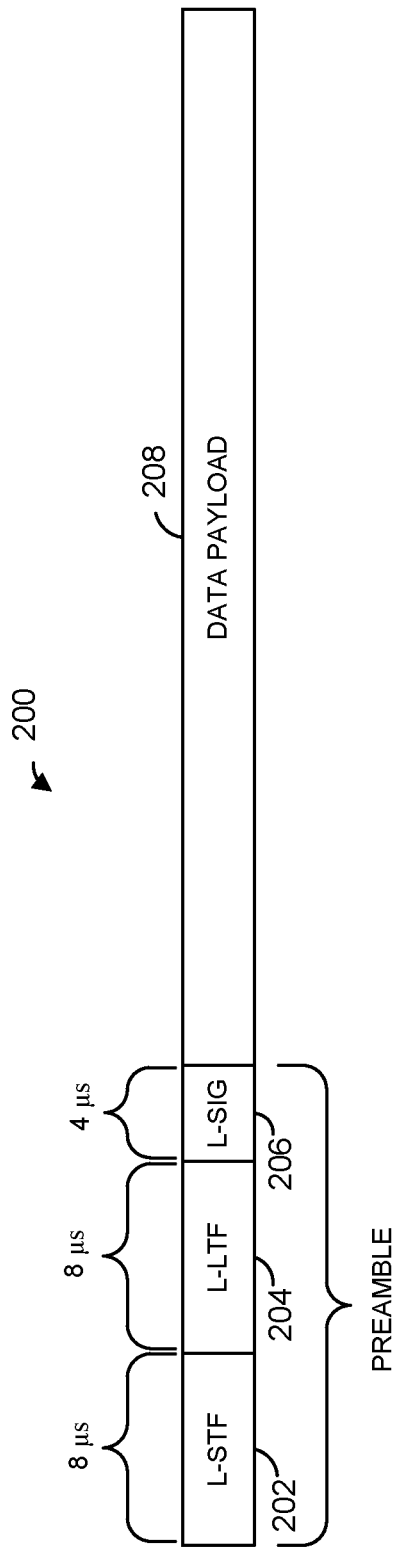
FIG. 2A
FIG. 2B

NULL DATA PACKET FORMAT FOR LONG RANGE WLAN

CROSS-REFERENCES TO RELATED APPLICATIONS

This application is a continuation of U.S. patent application Ser. No. 14/612,176, entitled "NDP Packet Format for a Communication Protocol with Multiple PHY Modes," filed on Feb. 2, 2015, which is a continuation of U.S. patent application Ser. No. 13/477,920, entitled "Sounding Packet Format for Long Range WLAN," filed on May 22, 2012, now U.S. Pat. No. 8,948,283, which claims the benefit of U.S. Provisional Patent Application No. 61/490,465, entitled "Sounding Packet Format for 11ah and 11af," filed on May 26, 2011, and U.S. Provisional Patent Application No. 61/494,349, entitled "Sounding Packet Format for 11ah and 11af," filed on Jun. 7, 2011. All of the applications referenced above are hereby incorporated by reference herein in their entireties.

FIELD OF THE DISCLOSURE

The present disclosure relates generally to communication networks and, more particularly, to long range low power wireless local area networks.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Development of wireless local area network (WLAN) standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard (now being finalized) specifies a single-user peak throughput in the gigabits per second (Gbps) range.

Work has begun on two new standards, IEEE 802.11ah and IEEE 802.11af, each of which will specify wireless network operation in sub-1 GHz frequencies. Lower frequency communication channels are generally characterized by better propagation qualities and extended propagation ranges compared to transmission at higher frequencies. In the past, sub-1 GHz ranges have not been utilized for wireless communication networks because such frequencies were reserved for other applications (e.g., licensed TV frequency bands, radio frequency band, etc.). There are few frequency bands in the sub 1-GHz range that remain unlicensed, with different specific unlicensed frequencies in different geographical regions. The IEEE 802.11ah Standard will specify wireless operation in available unlicensed sub-1 GHz frequency bands. The IEEE 802.11af Standard will specify wireless operation in TV White Space (TVWS), i.e., unused TV channels in sub-1 GHz frequency bands.

SUMMARY

In an embodiment, a method includes: determining, at a communication device, a physical layer (PHY) mode according to which a null data packet (NDP) is to be transmitted, the determined PHY mode from a set of PHY modes defined by a communication protocol, the set of PHY modes including i) a first PHY mode and ii) a second PHY mode; when the communication device determines that the NDP is to be transmitted according to the first PHY mode, generating, at the communication device, the NDP according to a first PHY format, including generating a PHY preamble of the NDP according to a first preamble format; when the communication device determines that the NDP is to be transmitted according to the second PHY mode, generating, at the communication device, the NDP according to a second PHY format, including generating the PHY preamble of the NDP according to a second preamble format; and transmitting the NDP with the communication device.

In another embodiment, an apparatus comprises a network interface associated with a communication device, the network interface having one of more integrated circuits (ICs). The one or more ICs are configured to determine a PHY mode according to which an NDP is to be transmitted, the determined PHY mode from a set of PHY modes defined by a communication protocol, the set of PHY modes including i) a first PHY mode corresponding and ii) a second PHY mode. The apparatus also comprises a media access control layer (MAC) processor implemented on the one or more ICs; and a PHY processor implemented on the one or more ICs. The PHY processor is configured to: when the communication device determines that the NDP is to be transmitted according to the first PHY mode, generate the NDP according to a first PHY format, including generating a PHY preamble of the NDP according to a first preamble format, when the communication device determines that the NDP is to be transmitted according to the second PHY mode, generate the NDP according to a second PHY format, including generating the PHY preamble of the NDP according to a second preamble format, and cause the communication device to transmit the NDP.

In yet another embodiment, a non-transitory, tangible computer readable medium, or media, stores machine readable instructions that, when executed by one or more processors of a communication device, cause the one or more processors to: determine a PHY mode according to which an NDP is to be transmitted, the determined PHY mode from a set of PHY modes defined by a communication protocol, the set of PHY modes including i) a first PHY mode and ii) a second PHY mode; when the one or more processors determine that the NDP is to be transmitted according to the first PHY mode, generate the NDP according to a first PHY format, including generating a PHY preamble of the NDP according to a first preamble format; when the one or more processors determine that the NDP is to be transmitted according to the second PHY mode, generate the NDP according to a second PHY format, including generating the PHY preamble of the NDP according to a second preamble format; and cause the communication device to transmit the NDP.

BRIEF DESCRIPTION OF THE DRAWINGS

FIGS. 2A and 2B are diagrams of a short range orthogonal frequency division multiplexing (OFDM) data unit, according to an embodiment;

DETAILED DESCRIPTION

Figure 1:
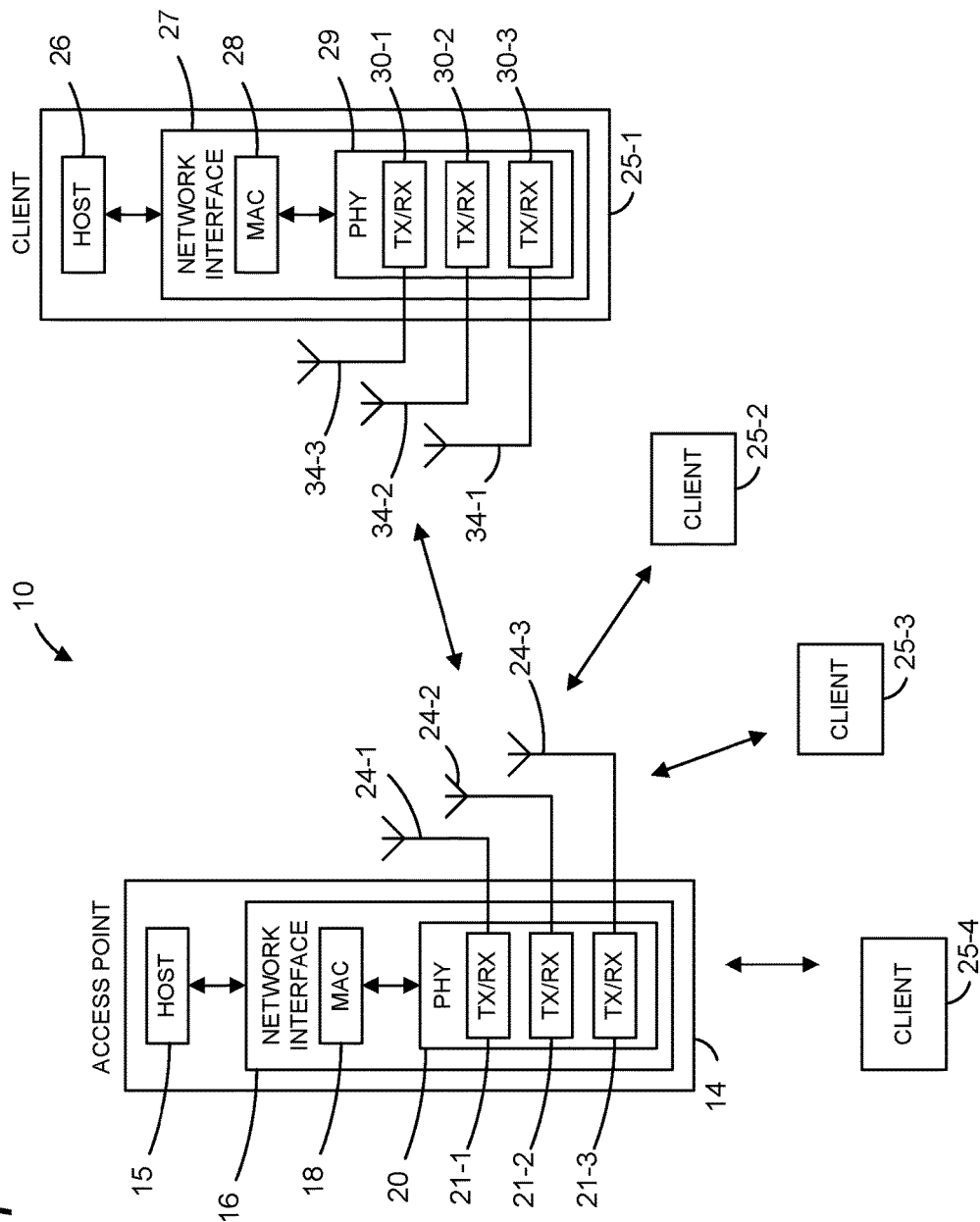
FIG. 1 is a block diagram of an example wireless local area network (WLAN) 10, according to an embodiment.

In embodiments described below, a wireless network device such as an access point (AP) of a wireless local area network (WLAN) transmits data streams to one or more client stations. The AP is configured to operate with client stations according to at least a first communication protocol. The first communication protocol defines operation in a sub 1 GH frequency range, and is typically used for applications requiring long range wireless communication with relatively low data rates (as compared with "short range" communication protocols discussed below). The first communication protocol (e.g., IEEE 802.11af or IEEE 802.11ah) is referred to herein as a "long range" communication protocol. In some embodiments, the AP is also configured to operate with client stations according to one or more other communication protocols which define operation in generally higher frequency ranges and are typically used for communication in closer ranges and with generally higher data rates as compared to the first communication protocol. The closer range communication protocols are collectively referred to herein as "short range" communication protocols.

In at least some embodiments, the AP and at least some of the client stations each include multiple antennas and are configured to utilize transmit and/or receive beamforming to enhance one or more of throughput, range, etc. Additionally or alternatively, in some embodiments, in a technique known as multi user communication, the AP is configured to utilize the spatial diversity provided by the multiple antennas by simultaneously transmitting data streams to multiple client stations. In such embodiments, the AP utilizes knowledge of the communication channels between the AP and the multiple client stations to steer each of the multiple data streams transmitted simultaneously to the intended user while minimizing interference from the other users. To these ends, in various embodiments and/or scenarios, the AP and/or a client station utilize knowledge of the channel to determine a beamforming or a beamsteering matrix to be applied to signals transmitted or received via multiple antennas. In some systems, obtaining explicit knowledge of the channel involves a beamformer transmitting known training signals to a beamformee, which then generates a measurement of the channel (sometimes referred to as channel state information or CSI) based on the received training signals. Transmitting such training signals is sometimes referred to as sounding a communication channel, or transmitting a sounding packet.

In some embodiments, the long range communication protocol defines one or more physical layer data unit formats the same as or similar to physical layer data unit format defined by one or more of the short range communication protocols. In one embodiment, to support communication over a longer range, and also to accommodate typically smaller bandwidth channels available at lower (sub 1-GHz) frequencies, the long range communication protocol defines data units having a format that is substantially the same as a physical layer data unit format defined by a long range communication protocol, but generated using a lower clock rate. Similarly, in an embodiment, the long range communication protocol specifies a null data packet (NDP) sounding packet format that is based on a PHY preamble format specified by a short range communication protocol, but generated using a lower clock rate. In an embodiment, the AP operates at a clock rate suitable for short range (and high throughput) operation, and down-clocking is used to generate a new clock signal to be used for the sub 1 GHz operation. As a result, in this embodiment, an NDP sounding packet that conforms to the long rage communication protocol maintains a physical layer preamble format of a data unit that generally conforms to a short range communication protocol ("short range data unit"), but is transmitted over a longer period of time and/or at a slower rate. An NDP packet comprises a preamble portion and omits a data payload portion.

In one embodiment, in a multi user system, a sounding packet is typically transmitted to each user individually, and, accordingly, in order to reduce the length of NPD sounding packets, NDP sounding packet format is based on a single user (SU) preamble format (rather than a multi user (MU) preamble format) specified by a short range communication protocol. Further, in some embodiments, the long range communication protocol specifies one or more extended range modes to further extend the communication range between devices (e.g., between the AP and the client stations, or between two client stations). In some such embodiments, the long range communication protocol specifies a suitable PHY preamble format for the extended range modes that is different from the PHY preamble format used for normal mode data units. In such embodiments, an NDP sounding packet format for sounding packets transmitted in the extended range mode is based on the PHY preamble format specified for the extended range data units. As a result, in this embodiment, an NDP sounding packet transmitted by an AP or a client station is formatted differently depending on the particular mode being utilized (e.g., normal PHY mode or extended range mode).

FIG. 1 is a block diagram of an example wireless local area network (WLAN) 10, according to an embodiment. An AP 14 includes a host processor 15 coupled to a network interface 16. The network interface 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 can include different numbers (e.g., 1, 2, 4, 5, etc.) of transceivers 21 and antennas 24 in other embodiments.

The WLAN 10 includes a plurality of client stations 25. Although four client stations 25 are illustrated in FIG. 1, the WLAN 10 can include different numbers (e.g., 1, 2, 3, 5, 6, etc.) of client stations 25 in various scenarios and embodiments. At least one of the client stations 25 (e.g., client station 25-1) is configured to operate at least according to the long range communication protocol. In some embodiments, at least one of the client stations 25 (e.g., client station 25-4) is a short range client station that is configured to operate according to one or more of the short range communication protocols.

The client station 25-1 includes a host processor 26 coupled to a network interface 27. The network interface 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 can include different numbers (e.g., 1, 2, 4, 5, etc.) of transceivers 30 and antennas 34 in other embodiments.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the network interface 16 of the AP 14 is configured to generate data units conforming to the long range communication protocol and having formats described hereinafter. The transceiver(s) 21 is/are configured to transmit the generated data units via the antenna(s) 24. Similarly, the transceiver(s) 24 is/are configured to receive the data units via the antenna(s) 24. The network interface 16 of the AP 14 is configured to process received data units conforming to the long range communication protocol and having formats described hereinafter, according to various embodiments.

In various embodiments, the network interface 27 of the client device 25-1 is configured to generate data units conforming to the long range communication protocol and having formats described hereinafter. The transceiver(s) 30 is/are configured to transmit the generated data units via the antenna(s) 34. Similarly, the transceiver(s) 30 is/are configured to receive data units via the antenna(s) 34. The network interface 27 of the client device 25-1 is configured to process received data units conforming to the long range communication protocol and having formats described hereinafter, according to various embodiments.

FIG. 2A is a diagram of a short range OFDM data unit 200 that the network interface 16 of the AP 14 is configured to generate and transmit to the client station 25-4 via orthogonal frequency division multiplexing (OFDM) modulation when operating according to a short range communication protocol, according to an embodiment. In an embodiment, the network interface of the client station 25-4 is also configured to generate and transmit the short range data unit 200 to the AP 14. The data unit 200 conforms to the IEEE 802.11a Standard (and/or the IEEE 802.11b Standard) and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters of the data unit 200, such as modulation type and coding rate used to transmit the data unit, for example. The data unit 200 also includes a data payload portion 208. FIG. 2B is a diagram of example data payload portion 208 (not low density parity check encoded), which includes a service field, a scrambled physical layer service data unit (PSDU), tail bits, and padding bits, if needed. The data unit 200 is designed for transmission over one spatial or space-time stream in single input a single output (SISO) channel configuration.

Figure 3:
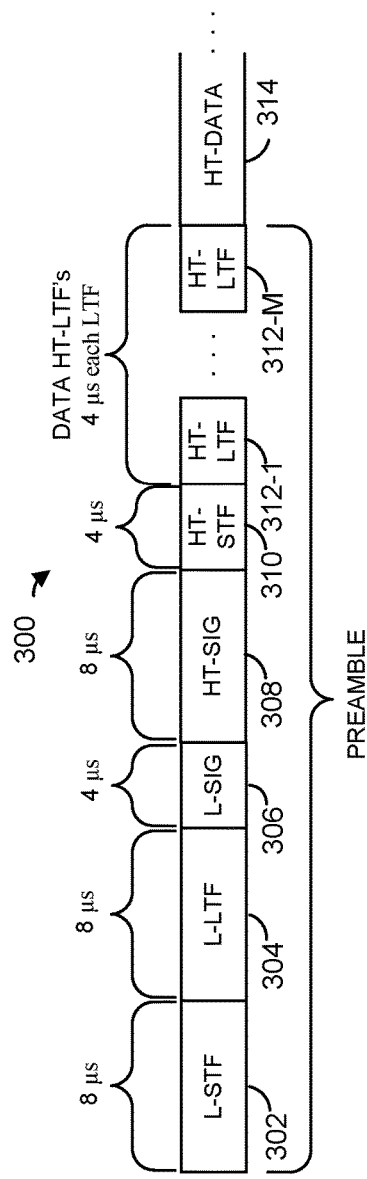
FIG. 3 is a diagram of a short range OFDM data unit, according to another embodiment.

FIG. 3 is a diagram of a short range OFDM data unit 300 that the network interface 16 of the AP 14 is configured to generate and transmit to the client station 25-4 via orthogonal frequency domain multiplexing (OFDM) modulation when operating according to a short range communication protocol, according to an embodiment. In an embodiment, the network interface of the client station 25-4 is also configured to generate and transmit the short range data unit 300 to the AP 14. The data unit 300 conforms to the IEEE 802.11n Standard, occupies a 20 MHz or a 40 MHz band, and is designed for mixed mode situations, i.e., when the WLAN includes one or more client stations that conform to the IEEE 802.11a Standard (and/or the IEEE 802.11g Standard) but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer which generally corresponds to a number of spatial or space-time streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial or space-time streams, and four HT-LTFs 312 is the data unit 300 is transmitted using three or four spatial or space-time streams. An indication of the particular number of spatial or space-time streams being utilized is included in the HT-SIG field 308. The data unit 300 also includes a data payload portion 314.

Figure 4:
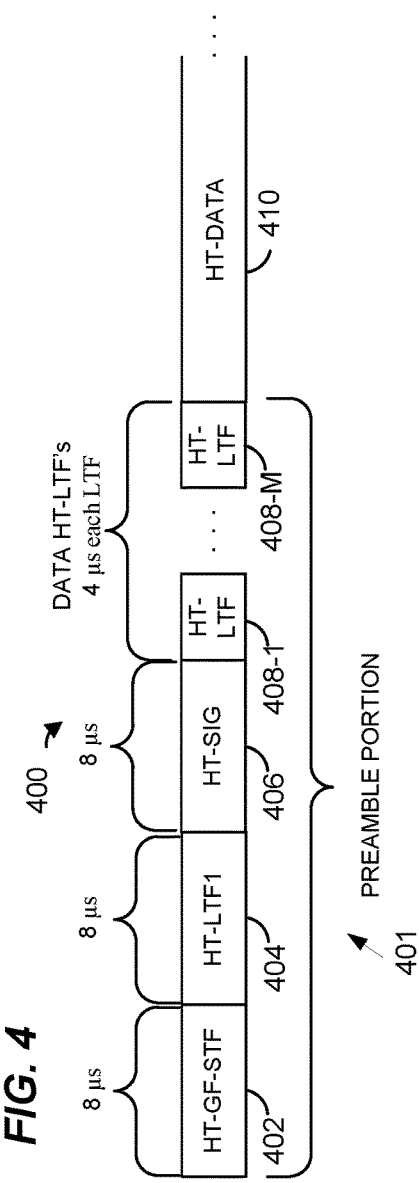
FIG. 4 is a diagram of a short range OFDM data unit, according to another embodiment.

FIG. 4 is a diagram of a short range OFDM data unit 400 that the network interface 16 of the AP 14 is configured to generate and transmit to the client station 25-4 via orthogonal frequency domain multiplexing (OFDM) modulation when operating according to a short range communication protocol, according to an embodiment. In an embodiment, the network interface of the client station 25-4 is also configured to generate and transmit the short range data unit 400 to the AP 14. The data unit 400 conforms to the IEEE 802.11n Standard, occupies a 20 MHz or a 40 MHz band, and is designed for "Greenfield" situations, i.e., when the WLAN does not include any client stations that conform to the IEEE 802.11a Standard (and/or the IEEE 802.11g Standard) but not the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial or space-time streams used to transmit the data unit 400 in a multiple input multiple output (MIMO) channel configuration. The data unit 400 also includes a data payload portion 410.

Figure 5:
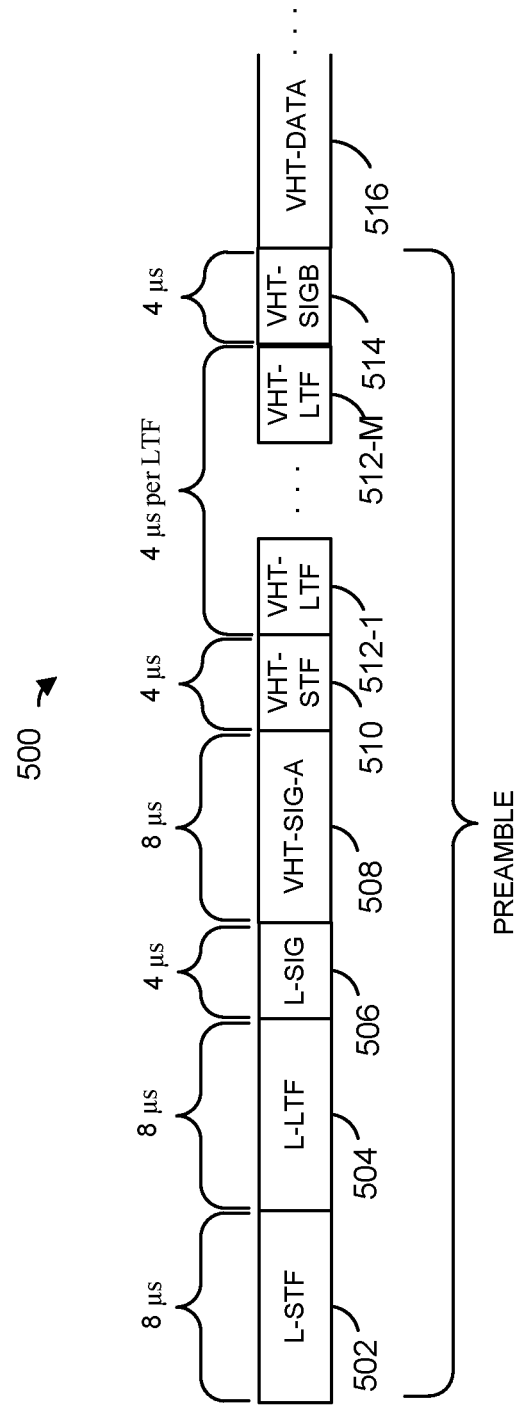
FIG. 5 is a diagram of a short range OFDM data unit, according to another embodiment.

FIG. 5 is a diagram of a short range OFDM data unit 500 that the network interface 16 of the AP 14 is configured to generate and transmit to the client station 25-4 via orthogonal frequency domain multiplexing (OFDM) modulation when operating according to a short range communication protocol, according to an embodiment. In an embodiment, the network interface of the client station 25-4 is also configured to generate and transmit the data unit 500 to the AP 14. The data unit 500 conforms to the IEEE 802.11ac Standard and is designed for "Mixed field" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, a first very high throughput signal field (VHT-SIG-A) 508, a very high throughput short training field (VHT-STF) 510, M very high throughput long training fields (VHT-LTFs) 512, where M is an integer, a second very high throughput signal field (VHT-SIG-B) 514. The data unit 500 also includes a data payload portion 516. In some embodiments, the data unit 500 is a multi-user data unit which carries information to more than one of the client stations 25 simultaneously. In such embodiments or scenarios, the VHT-SIG-A field 508 includes information common to all of the intended client stations, and the VHT-SIG-B field 514 includes user-specific information for each of the intended client stations.

Figure 6:
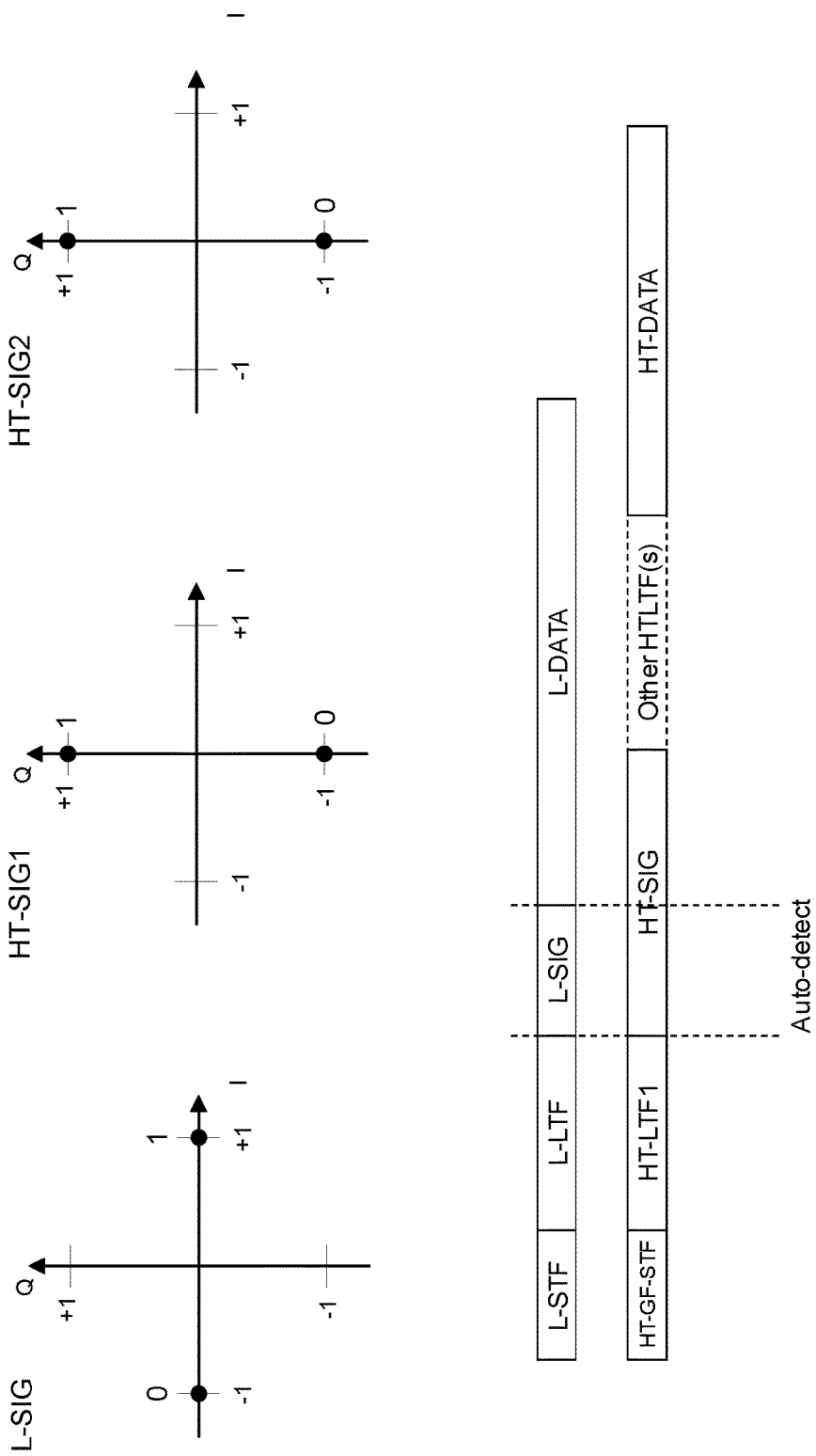
FIG. 6 is a set of diagrams illustrating modulation of various preamble fields as defined by the IEEE 802.11n Standard.

FIG. 6 is a set of diagrams illustrating modulation of the L-SIG, HT-SIG1, and HT-SIG2 fields as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field. As illustrated in FIG. 6, such modulation allows a receiving device to determine or auto-detect, without decoding the entire preamble, that the data unit conforms to the IEEE 802.11n Standard rather than the IEE802.11a Standard.

Figure 7:
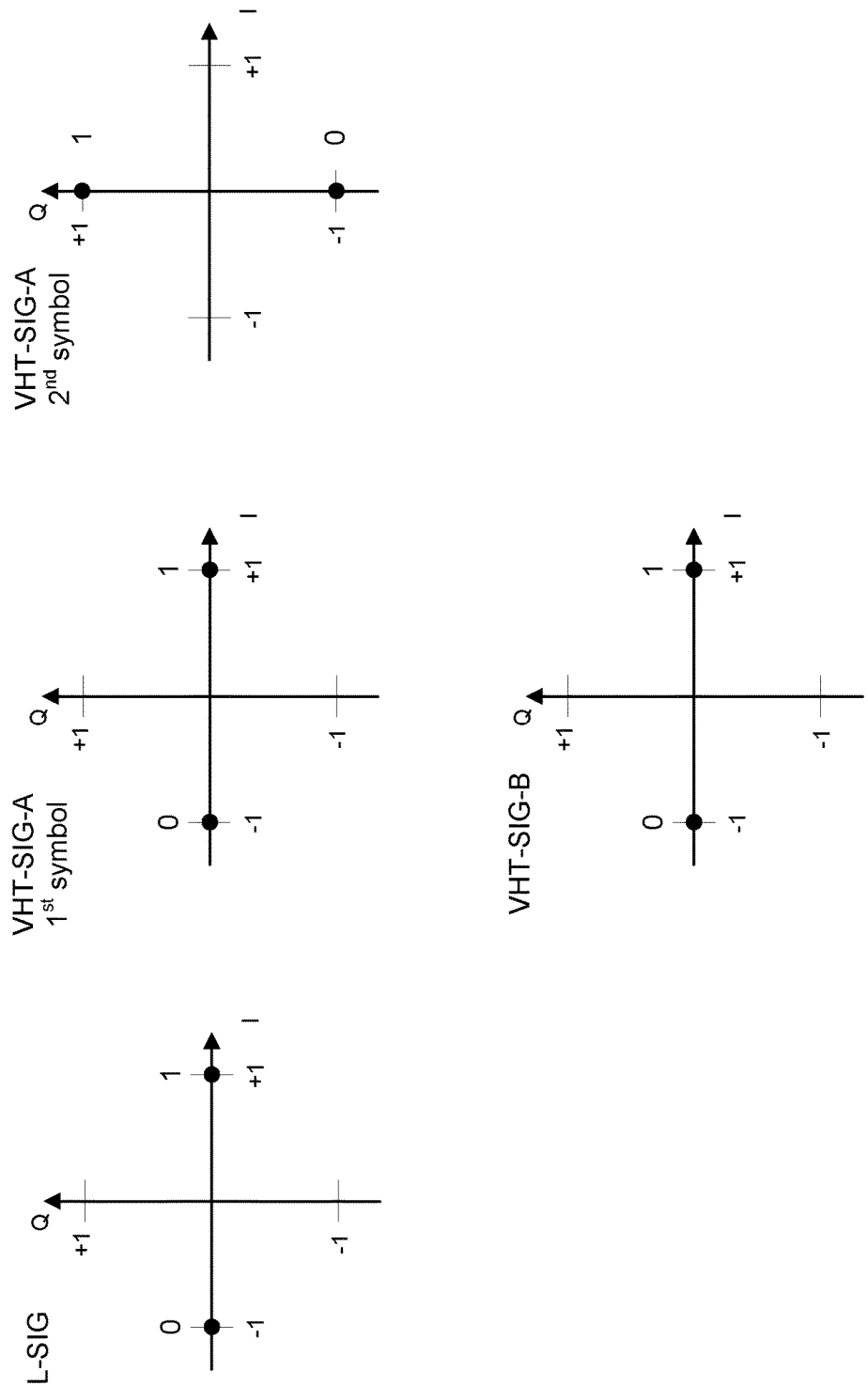
FIG. 7 is a set of diagrams illustrating modulation of various preamble fields as defined by the IEEE 802.11ac Standard.

FIG. 7 is a set of diagrams illustrating modulation of the L-SIG field, the first symbol of the VHT-SIG-A field, the second symbol of the VHT-SIG-A field, and VHT-SIG-B as defined by the IEEE 802.11ac Standard. The L-SIG field is modulated according to binary phase shift keying (BPSK). Similarly, first symbol of the VHT-SIG-A field is modulated according to BPSK. On the other hand, the second symbol of the VHT-SIG-A field is modulated according to BPSK, but on the quadrature axis (Q-BPSK). The VHT-SIG-B field is modulated according to BPSK, similar to the L-SIG-field and the first symbol of the VHT-SIG-A field. Such modulation allows a receiving device to determine or auto-detect, without decoding the entire preamble, that the data unit conforms to the IEEE 802.11ac Standard rather than either one of the IEE802.11a Standard or the IEEE 802.11n Standard.

In various embodiments and/or scenarios, long range data units have a physical layer format the same as or similar to the physical layer data unit format defined by a short range communication protocol (e.g., a physical data unit format described above with respect to FIGS. 2-5), but transmitted using a slower clock rate. In such embodiments, the network interface 16 of the AP 14 down-samples or "down-clocks" the clock rate used for generating short range data units, by a factor of N, to a lower clock rate to be used for transmitting long range data units. The down-clocking factor N is different in different embodiments and/or scenarios. For example, in one embodiment and/or scenario, down-clocking factor N is equal to 10. In this embodiment, a long range data unit generated using the down-clocked clock rate is transmitted over a time that is ten times longer than the time it takes to transmit the corresponding short range data unit. In the frequency domain, according to this embodiment, a long range data unit generated using the down-clocked clock rate occupies a bandwidth that is ten times smaller than the bandwidth occupied by the corresponding short range data unit. In other embodiments and/or scenarios, other suitable down-clocking factor (N) values are utilized, and transmission times and bandwidths of long range data units are scaled accordingly. In some embodiments and/or scenarios, the down-clocking factor N is a power of two (e.g., N=8, 16, 32, etc.). In some embodiments, the long range communication protocol specifies more than one down-clocking factor N, with a different down-clocking factor N used in a different geographical region (e.g., N=16 in US, N=64 in Europe) to accommodate different bandwidth requirements of the different regions, for example. Some examples of data unit formats defined by a long range communication protocol, according to some embodiments, are described in U.S. patent application Ser. No. 13/359,336, filed on Jan. 26, 2012, which is hereby incorporated by reference herein in its entirety.

According to an embodiment, in order to perform beamforming, a beamformer (e.g., the network interface 16 of the AP 14) generates and transmits a sounding packet (e.g., an NDP sounding packet), which includes one or more known training signals, to a beamformee (e.g. the client station 25-1), and the beamformee determines (e.g., the network interface 27 of the client station 25-1 determines), based on the received training signals, CSI of the communication channel between the beamformee and the beamformer. In one implementation, the beamformee then transmits (e.g., the network interface 27 of the client station 25-1 transmits) the CSI back to the beamformer, which then generates (e.g., the network interface 16 of the AP 14 generates) the beamforming matrix using the CSI. In another implementation, the beamformee uses the CSI to generate the beamforming matrix, and then transmits coefficients of the beamforming matrix back to the beamformer. In various embodiments, NDP sounding packet format specified by the long range communication protocol is based on an single user (SU) PHY preamble format specified by a short range communication protocol (e.g., preamble of the data unit 200 of FIG. 2A, preamble of the data unit 300 of FIG. 3, preamble of the data unit 400 of FIG. 4, preamble of the data unit 500 of FIG. 5, or another preamble specified by a short range communication protocol, or another suitable short range preamble) generated using a lower clock rate compared to the clock rate used to generate PHY data units that conform to the short range communication protocol.

Figure 8A:
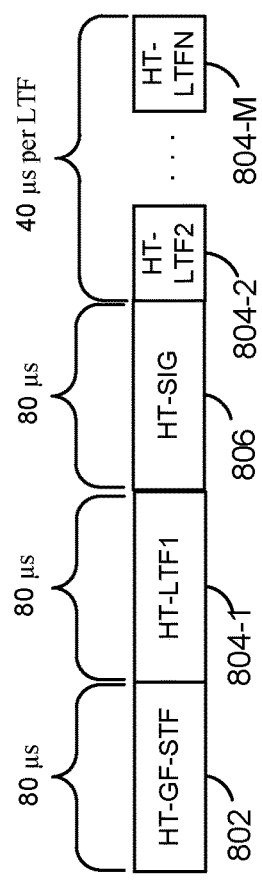
FIG. 8A is a diagram of an example null data packet (NDP) sounding packet, according to an embodiment.

FIG. 8A is a diagram of an NDP sounding packet 800 that the network interface 16 of the AP 14 is configured to generate and to transmit to the client station 25-1 via orthogonal frequency domain multiplexing (OFDM) modulation when operating in a long range mode, according to an embodiment. In an embodiment, the NDP sounding packet 800 includes a PHY preamble formatted the same as the greenfield preamble 401 of the data unit 400 (FIG. 4) except that the NDP sounding packet 800 is transmitted using a clock rate that is down-clocked from the short range clock rate by a down-clocking factor N. As a result, each OFDM symbol of the NDP packet 800 is N times longer in time duration compared to an OFDM symbol included in the preamble 401 of the data unit 400. In the embodiment of FIG. 8A, N is equal to 10. Accordingly, each OFDM symbol included in the NDP sounding packet 800 is 10 times longer compared to an OFDM symbol included in the preamble portion 401 of the data unit 400. Accordingly, in the NDP sounding packet 800, each OFDM symbol of the NDP sounding is 40 µs in duration. As illustrated in FIG. 8A, the NDP sounding packet 800 includes a two-OFDM symbol (80 µs) GF-STF field 802, a two-OFDM symbol (80 µs) LTF1 field 804, a two-OFDM symbol (80 µs) SIG field 806, and M one-OFDM symbol LTF fields 808. In other embodiments, other suitable down-clocking factors are utilized, resulting in OFDM symbol duration different from the OFDM symbol duration of the NDP sounding packet 800. The NDP sounding packet 800 omits a data payload portion.

Figure 8B:
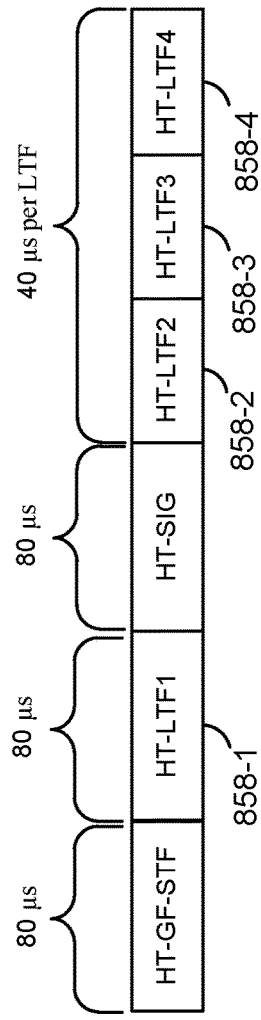
FIG. 8B is an example NDP sounding packet generated according to the example sounding packet format of FIG. 8A for a case of four antennas, according to an embodiment.

In order to allow the client station 25-1 to obtain a full channel estimate of the communication channel, in various embodiments and/or scenarios, the number of long training fields included in the NDP sounding packet 800 equals the number of transmit antennas 24 of AP 14. As an example, FIG. 8B is an example NDP sounding packet 850 generated and transmitted by network interface 16 of the AP 14 in a case in which the AP 14 includes four antennas 24. Accordingly, as illustrated in FIG. 8B, the NDP sounding packet 850 includes four LTF fields 858.

Figure 9:
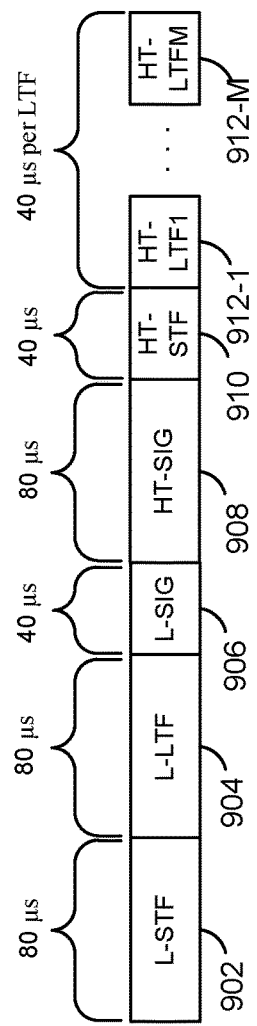
FIG. 9 is a diagram of an example NDP sounding packet, according to another embodiment.

FIG. 9 is a diagram of an NDP sounding packet 900 that the network interface 16 of the AP 14 is configured to generate and to transmit to the client station 25-1 via orthogonal frequency domain multiplexing (OFDM) modulation when operating in a long range mode, according to an embodiment. The NDP sounding packet 900 includes only a preamble that is formatted similar to the mixed preamble portion 501 of the data unit 500 of FIG. 5, except that the NDP sounding packet 900 is transmitted using a clock rate that is down-clocked from the short range clock rate by a down-clocking factor N. As a result, symbol duration of each OFDM symbol of the NDP packet 900 is N times longer compared to symbol duration of an OFDM symbol included in the preamble portion 501 of the data unit 500. In the embodiment of FIG. 8, N is equal to 10. Accordingly, each OFDM symbol included in the NDP sounding packet 900 is 10 times longer compared to an OFDM symbol included in the preamble portion 401. In particular, in the embodiment of FIG. 9, each OFDM symbol of the NDP sounding is 40 µs in duration. As illustrated, in this embodiment, the NDP sounding packet 900 includes a two-OFDM symbol (80 µs) L-LTF field 902, a two-OFDM symbol (80 µs) L-LTF field 904, a one-OFDM symbol (40 µs) L-SIG field 906, a two-OFDM symbol (80 µs) HT-SIG field, a two-OFDM symbol (80 µs) HT-SIG field 906, a one-OFDM symbol (40 µs) HT-STF field 910, and M one-OFDM symbol LTF fields 912. In order to allow the client station 25-1 to obtain a full channel estimate of the communication channel, in various embodiments and/or scenarios, the number of long training fields included in a sounding packet equals the number of transmitting antennas at the transmitter (e.g., AP 14). Thus, in an embodiment, the number M of the LTF fields 912 equals the number of transmit (or transmit/receive) antennas 24 of the AP 14. The NDP sounding packet 900 omits a data payload portion.

Figure 10:
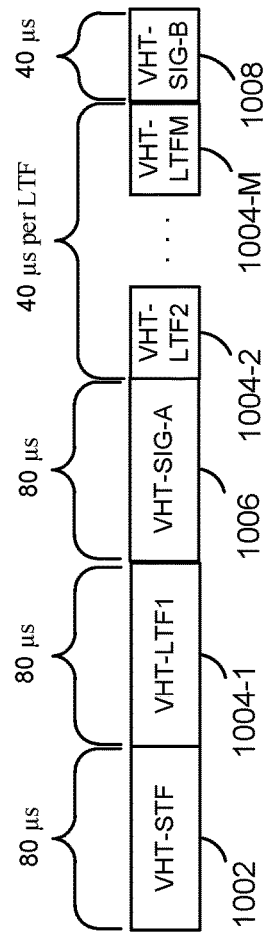
FIG. 10 is a diagram of an example NDP sounding packet, according to another embodiment.

FIG. 10 is a diagram of an NDP sounding packet 1000 that the network interface 16 of the AP 14 is configured to generate and to transmit to the client station 25-1 via orthogonal frequency domain multiplexing (OFDM) modulation when operating in a long range mode, according to an embodiment. The NDP sounding packet 1000 is similar to the NDP sounding packet 900 of FIG. 9 except that that the legacy portion of the preamble (i.e., L-STF 902, L-LTF 904, L-SIG 906) is omitted from the data unit 1000. Further, in the NDP sounding packet 1000, the STF field 1002 and the first LTF field (VHT-LTF1 field 1004-1) precede the VHT-SIG-A field 1006, and the remaining VHT-LTF fields 1004 follow the VHT-SIG-A field 1006. Additionally, the VHT-STF field 1002 is longer than the HT-STF field 910. In one embodiment, to shorten the NDP sounding packet 1000, the VHT-SIG-B field (generally used for information needed for decoding multi user data units) 1010 is omitted from the NDP sounding packet 1000. The NDP sounding packet 1000 omits a data payload portion.

In some embodiments, in addition to the down-clocked modes of operation discussed above ("normal PHY modes"), the long range communication protocol also specifies one or more "extended range modes" with a reduced data rate compared to the lowest data rate of the normal modes and/or occupying a smaller bandwidth (e.g., generated using a smaller size Fast Fourier Transform (FFT)) compared to the lowest bandwidth specified for normal modes PHY mode. Because of the lower data rate, the extended range mode further extends communication range and generally improves receiver sensitivity. In some such embodiments, PHY preamble format specified by the long range communication protocol for the extended range mode ("extended range mode preamble") is different compared to the PHY preamble format specified for normal mode ("normal mode preamble"). Accordingly, in at least some such embodiments, NDP sounding packets used in the extended range mode ("extended range mode NDP sounding packets") are formatted differently compared to NDP sounding packets used in normal mode ("normal mode NDP sounding packets"). For instance, an extended range mode NDP sounding packet includes a longer long training sequence for better channel estimation and/or a longer short training sequence for better packet detection and synchronization at a receiving device, in some embodiments. In some embodiments, PHY preamble format specified by the long range protocol for extended range mode includes an extra preamble portion in addition to the preamble specified for the normal mode. Some examples of preamble formats defined by the long range communication protocol for the extended range mode that correspond to NDP sounding packet formats according to some embodiments are described in U.S. patent application Ser. No. 13/359,336, filed on Jan. 26, 2012, which is hereby incorporated by reference herein in its entirety.

Figure 11:
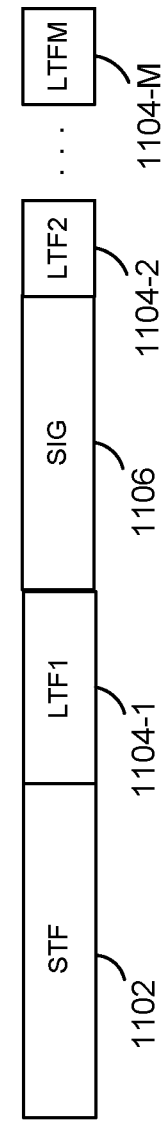
FIG. 11 is a diagram of an example NDP sounding packet to be transmitted in an extended range mode, according to an embodiment.

FIG. 11 is a diagram of an example NDP sounding packet 1100 used in the extended range mode, according to an embodiment. The NDP sounding packet 1100 is similar to the normal mode NDP sounding packet 800 of FIG. 8A except that the NDP sounding packet 1100 includes an STF field 1102 that is longer compared to the STF field 802 of the NDP sounding packet 800. The longer STF field 1102 includes more repetitions of a training sequence compared to the number of repetitions included in the STF field 802 of the normal PHY mode NDP sounding packet 800. As an example, the longer STF field 1102 includes four OFDM symbols and, accordingly, is 160 μs long compared to an 80 μs duration of the STF field 802. In another embodiment, the STF field 1102 is of a different duration greater than the 80 μs duration of the STF field 802. The sounding packet 1100 also includes a signal field 1106 that is longer compared to the signal field 806 of the sounding packet 800. Further, in some embodiments, each long training field 1104 included in the sounding packet 1100 is the same in duration as each corresponding long training field 804 of the sounding packet 800. In another embodiment, one or more of the long training fields 1104 of the sounding packet 1100 is longer compared to the corresponding long training field 804 of the sounding packet 800. The NDP sounding packet 1100 omits a data payload portion.

In some embodiments, the long range communication protocol specifies a single stream format for extended range mode regular data units. That is, in such embodiments, data units in the extended range mode are generally transmitted using only one spatial stream. Accordingly, in such embodiments, the extended range preamble format defined by the long range communication protocol includes only one long training field allowing a receiving device to generate a measurement of a single dimension communication channel. In such embodiments, if the AP 14 and/or the client station being sounded includes more than one antenna, a sounding packet needs to include multiple long training fields to allow the client station to obtain a full dimensional measurement of the communication channel. To this end, according to an embodiment, the long range communication protocol specifies a multi-stream NDP sounding packet format to be used in the extended range mode, even though extended range mode data packets are transmitted in a single stream format using only one spatial stream. In such embodiment, extended range NDP sounding packets include additional long training fields in addition to the single long training field specified for the extended range preamble format for regular data units transmitted in the extended range mode.

According to an embodiment, multiple long training fields included in an NDP sounding packet (for normal and/or extended mode) are spread over the multiple spatial or space-time streams by a mapping matrix P. In one embodiment, the number of LTFs included in an NDP sounding packet depends on the number of antennas included in the AP. For example, according to an embodiment, if the AP 14 includes two antennas, then the number of LTF fields included in each sounding packet that the AP 14 transmits is two. In the same embodiment, if the AP 14 includes either three or four antennas, then the number of LTF fields included in each sounding packet that the AP transmits is four. In general, in various embodiments, the number of LTFs included in a sounding packet transmitted by the AP 14 is any suitable number greater or equal to the number of antennas at the AP 14. In any case, in an embodiment, the LTFs included in a sounding (e.g. in the sounding packet 800 of FIG. 8A, the sounding packet 1100 of FIG. 11, etc.) are mapped to the multiple spatial or space-time streams according to:

$$[HTLTF1_k, HTLTF2_k, \ldots, HTLTFN_k] = Q_k D_{CSD}^{(k)} A_{HTLTF}^k LTF_k \quad \text{Equation 1}$$

where the subscript k denotes a tone index, Q is a spatial mapping matrix, $D_{CSD}$ is a diagonal matrix with diagonal elements representing cyclic shifts in the time domain, $A_{HTLTF}$ is a mapping matrix for the long training field, and $LTF_k$ is the long training field value for the $k^{th}$ tone.

As an example, the mapping matrix P used to map LTF tones in an NDP sounding packet to multiple spatial or space-time streams, in one embodiment, is given by:

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{Equation 2}$$

In an embodiment, a submatrix of the mapping matrix in Equation 2 is used for mapping LTF tones if the sounding packet is to be transmitted using less than four spatial or space-time streams (e.g., a 2×2 submatrix for two spatial or space-time streams with two LTFs, a 3×4 submatrix for three spatial or space-time streams with four LTFs, etc.).

In some embodiments, one or more of the long training fields included in an NDP sounding packet include pilot tones to allow a receiving device to accurately track frequency and/or phase offsets caused by the communication channel between the AP and the client station. Longer transmission channels over which long range NDP sounding packets typically travel result in a larger frequency and phase offsets between a transmitter and a receiver compared to frequency and/or phase offsets experienced by similar short range NDP packets, in at least some situations. Accordingly, in an embodiment, to combat the larger frequency offset, NDP sounding packets include single stream pilot tones in some or all of the long training fields. For clarity, single stream pilot tone insertion techniques are explained below with reference to the NDP sounding packet 850 of FIG. 8B. However, these or similar pilot insertion techniques are applied to other NDP sounding packet formats (e.g., sounding packets of FIG. 8B, FIG. 9. FIG. 10. FIG. 11, etc.), or other suitable NDP sounding packet formats, according to other embodiments.

With reference to FIG. 4, the short range data unit 400 does not include pilot tones in any of the HT-LTF fields 408. Referring to FIG. 8A, the NDP sounding packet 800 is generated for long range transmission and, accordingly, includes OFDM symbols of longer duration and, consequently, LTF fields of the sounding packet 800 are longer compared to the LTF fields of the data unit 400. As a result, a long training field is typically subject to a greater phase shift during transmission in long range mode than in short range mode. To mitigate the phase shift problem, in some embodiments, pilot tones are inserted into at least some of the training fields of the long range NDP sounding packet 800 and are used for phase tracking between the transmitter and the receiver. According to an embodiment, the NDP sounding packet 800 is a multi-stream sounding packet transmitted over a number of spatial streams in at least some situations. In this embodiment, if the inserted pilot tones are also multi-stream (e.g., mapped to the multiple spatial or space-time streams using the same mapping matrix as the mapping matrix used to map data tones), then at least a corresponding number of long training fields needs to be received before phase tracking can be performed. To enable a receiving device to perform phase tracking prior to having received all long training fields, in some embodiments, the pilot tones included in one or more of the long training fields 804 of the data unit 800 are single-stream pilot tones.

With continued reference to FIG. 8A, in an embodiment, the OFDM data and pilot tones of the HT-LTF fields 804 are mapped to multiple spatial or space-time streams according to:

$$[HTLTF1_k, HTLTF2_k, \ldots, HTLTFN_k] = \quad \text{Equation 3}$$
$$Q_k D_{CSD}^{(k)} A_{HTLTF}^k LTF_k$$

$$A_{HTLTF}^k = \begin{cases} R_{HTLTF}, & \text{if } k \in K_{Pilot} \\ P_{HTLTF}, & \text{otherwise} \end{cases}$$

where the subscript k denotes a tone index, Q is a spatial mapping matrix, $D_{CSD}$ is a diagonal matrix with diagonal elements representing cyclic shifts in the time domain, $A_{HTLTF}$ is a mapping matrix for the long training field, and $LTF_k$ is the long training field value for the $k^{th}$ tone. With continued reference to Equation 3, $K_{pilot}$ represents a set tone indices corresponding to pilot tones, and $P_{HTLHF}$ is a mapping matrix used for mapping long training field data tones to multiple spatial streams. As an example, according to an embodiment, $P_{HTLHF}$ for mapping LTF non-pilot tones to spatial or space-time streams is given by Equation 2 (above). Further, the $R_{HTLFT}$ matrix is a mapping matrix for LTF pilot tones, which is defined differently in different embodiments. In one embodiment, the $R_{HTLFT}$ matrix is given by:

$$[R_{HTLTF}]_{m,n}=[P_{HTLTF}]_{m,1}, \quad 1 \leq m, n \leq N_{HTLTF} \quad \text{Equation 3.}$$

Accordingly, in this embodiment, all pilot tones in HT-LTF fields 804 are mapped to multiple spatial or space-time streams using the first column of the spatial stream mapping matrix P.

In another embodiment, the $R_{HTLFT}$ matrix is as defined in the IEEE 802.11ac Standard, given by:

$$[R_{HTLTF}]_{m,n}=[P_{HTLTF}]_{1,m}, \quad 1 \leq m, n \leq N_{HTLTF} \quad \text{Equation 4.}$$

Accordingly, in this embodiment, all pilot tones in HT-LTF fields 804 are mapped to multiple spatial or space-time streams using the first row of the spatial stream mapping matrix P.

According to an embodiment, the AP 14 signals to a client station the a packet is an NDP sounding packet rather than a regular data unit using an indication included in a signal field of the NDP sounding packet or a signal field included in a preamble of a regular data unit. For example, in an embodiment, a length or a duration subfield included in the signal field is set to a value of zero to indicate that the packet is a sounding packet, and is used to indicate a length of the packet in the case of a regular data unit. In another embodiment, the long range communication protocol specifies signal field bit allocation that includes a bit to specifically indicate whether the packet is an NDP sounding packet or a regular data unit. In yet another embodiment, the long range communication protocol specifies a value for a subfield of the signal field typically not used for regular data units (i.e., a value outside of possible values specified for regular data units by the long range communication protocol) to be used to signal a sounding packet. As an example, in some embodiments, the long range communication protocol specifies a valid range of values between 0 and 10 a signal field subfield used to specify the modulation and coding scheme (MCS) used to transmit the data unit. In one such embodiment, the long range communication protocol specifies that a value in the MCS subfield other than a value in the valid MCS values range specified for regular data units indicates that the data unit is a sounding packet (e.g., a value of 11, 12, 13, etc.). In some such embodiments, the length subfield of a signal field can be used to communicate information other than the length of the packet (e.g., to communicate the number of spatial or space time streams for which the NDP sounding packet is generated). In some embodiments, a sounding packet is identified by more than one subfields of the signal field. For example, in one embodiment, a signal field of an NDP sounding packet includes an MCS subfield with an MCS value that is a suitable value other than a valid value specified for regular data units and also includes a value of zero in the length or duration subfield.

In some embodiments in which the extended range mode PHY preamble format is specified for only a single spatial stream, the preamble format need not include an indication of the number of spatial streams corresponding to the regular extended range data units. On the other hand, as discussed above, NDP sounding packets are multi-stream packets that allow a receiver to estimate a full dimensional response of the communication channel even in an extended range mode in which regular data unit are always single stream packets. Accordingly, in various embodiments, an indication of the number of spatial or space-time streams of an extended range NDP sounding packet is signaled in the signal field of the NDP sounding packet.

Figure 12A:
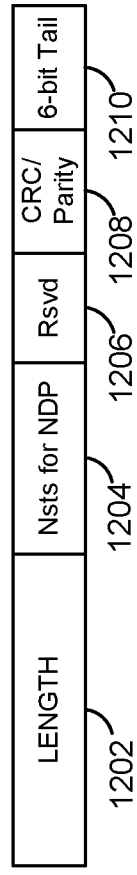
FIG. 12A is a diagram of an example signal field included in an NDP sounding packet and/or in a preamble of a regular data unit, according to an embodiment.

FIG. 12A is a diagram of an example signal field 1200 included in an NDP sounding packet and/or in a preamble of a regular data unit, according to an embodiment. In an embodiment, the signal field 1200 is also included in a preamble portion of a regular data unit transmitted in normal and/or in extended range mode. The signal field 1200 includes a Length subfield 1202, a number of spatial or space-time streams (Nsts) subfield 1204, a Reserved subfield 1206, a cyclic redundancy check (CRC)/Parity check subfield 1208 and a Tail subfield 1210. In an embodiment, a first value (e.g., zero) in the Length subfield 1202 indicates to a receiver that the packet is an NDP sounding packet rather than a regular data unit. In this case, in an embodiment, the Nsts subfield 1204 is used to indicate the number of spatial or space-time streams corresponding to the NDP sounding packet 800. On the other hand, the Length subfield 1202 is not set to the first value (e.g., the Length subfield 1202 is non-zero) (i.e., the signal field 1200 belongs to a regular data unit rather than an NDP sounding packet), then the Nsts subfield 1204 is interpreted as a reserved subfield.

Figure 12B:
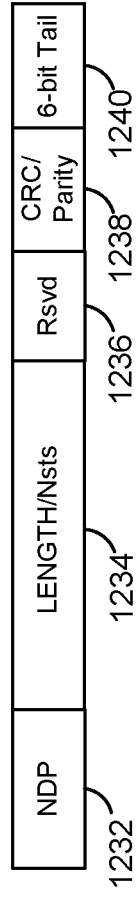
FIG. 12B is a diagram of an example signal field included in an NDP sounding packet and/or in a preamble of a regular data unit, according to another embodiment.

FIG. 12B is a diagram of an example signal field 1230 included in an NDP sounding packet and/or in a preamble of a regular data unit, according to an embodiment. In an embodiment, the signal field 1230 is also included in a preamble portion of a regular data unit transmitted in normal and/or in extended range mode. The signal field 1230 includes an NDP field 1232, a Length/Nsts subfield 1234, a Reserved subfield 1236, a cyclic redundancy check (CRC)/Parity check subfield 1238 and a Tail subfield 1240. In an embodiment, the NDP subfield 1232 is set to a first value (e.g., a logic one (1)) to indicate that the packet is an NDP sounding packet and to a second value (e.g., a logic zero (0)) to indicate that the packet is a regular data unit. In an embodiment, the NDP subfield 1232 is replaced by a regular subfield specified for a regular data unit. In this case, to indicate that the packet is a sounding packet, the regular subfield is set to a value different than a valid value used for regular data units, according to an embodiment. For example, in one embodiment, the NDP subfield 1232 is replaced by an MCS subfield generally used to signal a modulation and coding scheme used for transmitting the regular data unit. In this embodiment, the subfield specified for the regular data unit is set to a value other than a valid MCS value specified as a suitable MCS value for regular data units. For example, in an embodiment in which a valid MCS value specified for regular data units is a value in the range of 0 through 10, the MCS subfield is set to a value other than a value in the range of 0 through 10 (e.g. 11, 12, 13, etc.) to indicate that the packet is a sounding packet and not a regular data unit. If the NDP subfield (or another subfield, such as an MCS subfield) indicates that the packet is a sounding packet, a suitable number of bits of the Length subfield 1234 are used to indicate the number of spatial or space-time streams of the NDP sounding packet. For example, in an embodiment, the first two bits of the Length subfield 1234 are used to indicate up to four spatial or space-time streams. According to an embodiment, unused bits of the Length subfield 1234 are set to a value of zero, for example. On the other hand, if the packet is a regular data unit rather than NDP sounding packet, as indicated by the NDP subfield 1232, then the Length/Nsts subfield 1234 is used to signal the length of the data unit to the receiving device.

Figure 12C:
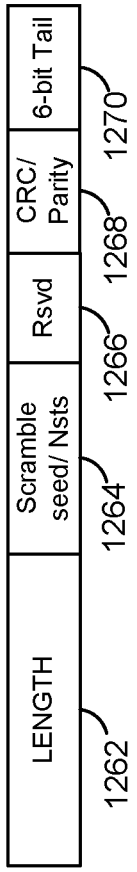
FIG. 12C is a diagram of an example signal field included in an NDP sounding packet and/or in a preamble of a regular data unit, according to another embodiment.

FIG. 12C is a diagram of an example signal field 1250 included in an NDP sounding packet and/or in a preamble of a regular data unit, according to an embodiment. In an embodiment, the signal field 1250 is also included in a preamble portion of a regular single stream data unit transmitted in extended range mode. The signal field 1250 includes a Length subfield 1262, a Scrambler seed/Nsts subfield 1264, a Reserved subfield 1266, a cyclic redundancy check (CRC)/Parity check subfield 1268, and a Tail subfield 1270. In an embodiment, the Scrambler seed/Nsts subfield 1264 is implemented using four bits. In an embodiment, a first value (e.g., zero) in the Length subfield 1202 indicates to a receiver that the packet is an NDP sounding packet rather than a regular data unit. In this case, a suitable number of bits of the Scramble seed/Nsts subfield 1264 are used to indicate the number of spatial or space-time streams included in the NDP sounding packet. For example, in one embodiment, two bits (e.g., two least significant bits (LSB)) of the Scrambler seed/Nsts subfield 1264 are used to indicate the number of spatial or space-time streams. In this case, according to an embodiment, bits of the Scrambler seed/Nsts subfield 1264 not being used to indicate the number of spatial or space-time streams are reserved. For example, in an embodiment, two most significant bits (MSB) of the Scrambler seed/Nsts subfield 1264 are reserved.

In an embodiment, a value not equal to the first value (e.g., a value greater than zero) in the Length field 1262 indicates that the packet is a regular data unit. In this case, the Scrambler seed/Nsts subfield 1264 is used to indicate a value of the scrambler seed needed to properly process the data payload portion of the data unit (or a portion of the scrambler seed if the scrambler seed value includes more bits compared to the number of bits allocated for Scrambler seed/Nsts subfield 1264). For example, in an embodiment, if four bits are allocated for the Scrambler seed/Nsts subfield 1264, then four LSB of the scrambler seed are represented by the Scrambler seed/Nsts subfield 1264. In an embodiment, the scrambler seed is seven bits long. In this embodiment, each of the remaining three bits (3 MSB) of the scrambler seed is fixed to logic one (1). In this embodiment, because the signal field 1260 includes a field an indicating the scrambler seed for processing data units, a service field (which is typically used to signal the value of the scrambler seed) is omitted from the corresponding data unit.

In various embodiments, the network interface 16 of the AP 14 is configured to generate NDP packets and regular packets that include signal fields according to one or more of the formats in FIGS. 12A, 12B, 12C. In various embodiments, the network interface 27 of the client device 25-1 is configured to generate NDP packets and regular packets that include signal fields according to one or more of the formats in FIGS. 12A, 12B, 12C.

In various embodiments, upon receiving a packet including a signal field 1200, 1230, or 1260, the network interface 16 of the AP 14 is configured to interpret one or more of the subfields 1204, 1234, 1264, respectively, differently depending on the values of the subfields 1202, 1232, and 1262, respectively, as discussed above. In various embodiments, upon receiving a packet including a signal field 1200, 1230, or 1260, the network interface 27 of the client station 25-1 is configured to interpret one or more of the subfields 1204, 1234, 1264, respectively, differently depending on the values of the subfields 1202, 1232, and 1262, respectively, as discussed above.

In some embodiments, the AP 14 and/or the client station 25-1 is able to operate in dual band configurations. In such embodiments, the AP 14 is able to switch between short range and long range modes of operation. Accordingly, in an embodiment, when operating in a short range mode, the AP 14 transmits and receives data units that conform to one or more of the short range communication protocols, and when operating in a long range mode, the AP 14 transmits and receives data units that conform to the long range communication protocol. In an embodiment, a dual band device utilizes a first clock suitable for short range operation and utilizes a second clock suitable for long range operation, where a frequency of the second clock is lower than a frequency of the first clock by a factor of N. In an embodiment, a dual band device generates the second clock signal for long range operation by down-clocking the first clock signal by a factor N. Accordingly, in such embodiments, the clock rate used in long range mode is a fraction of a clock rate used in short range mode. In such embodiments, NDP sounding packets for long range are generated according to a short range preamble format specified by a short range communication protocol but using the lower clock rate, as discussed above. Further, in some embodiments, the AP 14 and/or the client station 25-1 is a dual band device that is able to switch between different low frequency bands defined for long range operation by the long range communication protocol (e.g., different sub-1 GHz frequency band defined by the long range communication protocol for different geographical areas). In yet another embodiment, the AP 14 and/or the client station 25-1 is a single band device configured to operate in only one long range frequency band and to generate NDP sounding packets based on preamble format (or formats) specified by the long range communication protocol.

Figure 13:
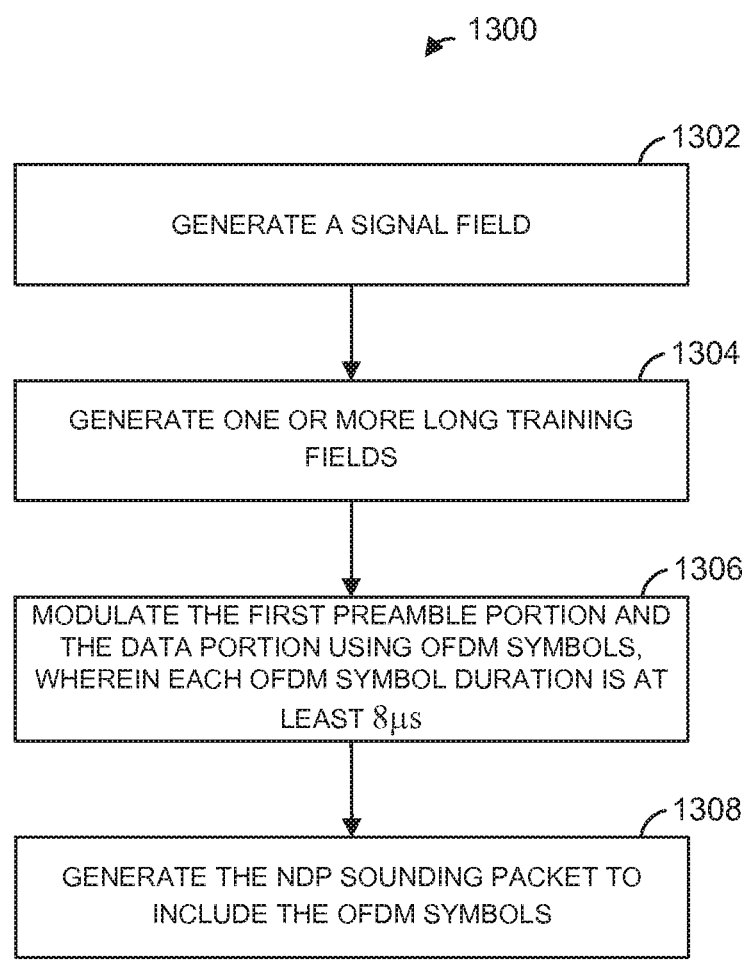
FIG. 13 is a flow diagram of an example method for generating an NDP sounding packet, according to an embodiment.

FIG. 13 is a flow diagram of an example method 1300 for generating an NDP sounding packet, according to an embodiment. With reference to FIG. 1, the method 1300 is implemented by the network interface 16 of the AP 14, in an embodiment. For example, in one such embodiment, the PHY processing unit 20 is configured to implement the method 1300. According to another embodiment, the MAC processing 18 is also configured to implement at least a part of the method 1300. With continued reference to FIG. 1, in yet another embodiment, the method 1300 is implemented by the network interface 27 (e.g., the PHY processing unit 29 and/or the MAC processing unit 28) of the client station 25-1. In other embodiments, the method 1300 is implemented by other suitable network interfaces.

At block 1302, a signal field to be included in the NDP sounding packet is generated. For example, in one embodiment, the signal field 806 of FIG. 8A is generated. In another embodiment, one of signal fields 1200 of FIG. 12A, signal field 1230 of FIG. 12B or the signal field 1260 of FIG. 12C is generated. In another embodiment, another suitable signal field is generated.

At block 1304, one or more long training fields are generated. In an embodiment, the number of training fields generated at block 1304 is greater than or equal to the number of antennas included in the transmitting device. At block 1306, the signal field generated at block 1302 and the one or more long training fields generated at block 1304 are modulated using OFDM modulation. The symbol duration of each OFDM symbol generated at block 1306 is at least 8 µs, in an embodiment. In one embodiment, the OFDM symbol duration is 40 µs. In another embodiment, the OFDM symbol duration is another suitable value of at least 8 µs. At block 1308, the NDP sounding packet is generated to include the OFDM symbols generated at block 1306.

Figure 14:
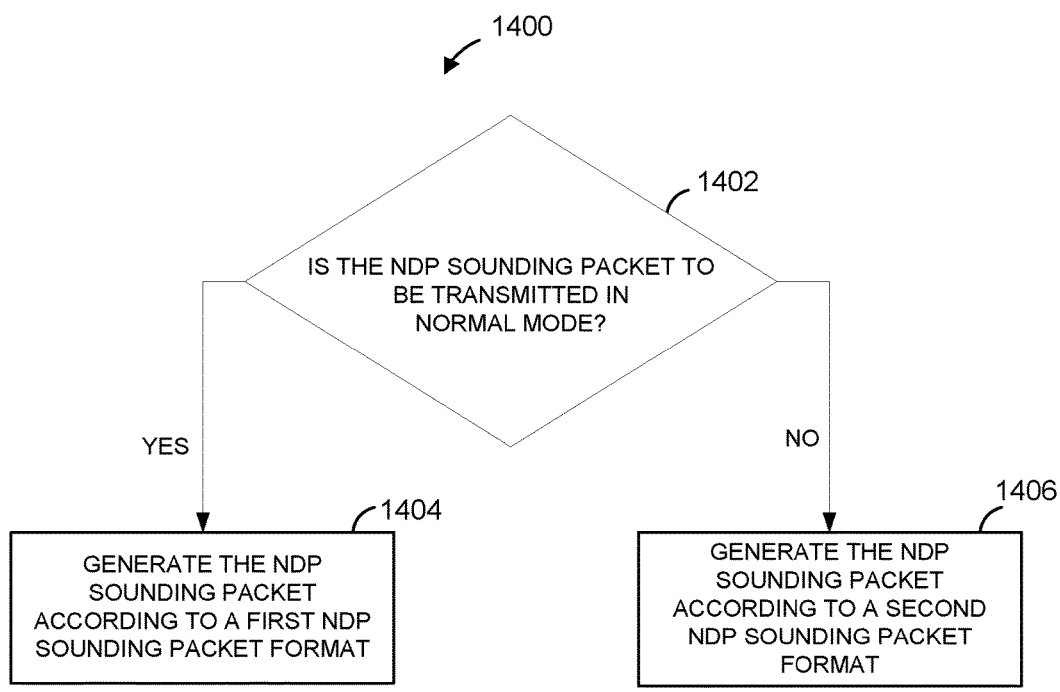
FIG. 14 is a flow diagram of an example method, according to an embodiment.

FIG. 14 is a flow diagram of an example method 1400, according to an embodiment. With reference to FIG. 1, the method 1400 is implemented by the network interface 16 of the AP 14, in an embodiment. For example, in one such embodiment, the PHY processing unit 20 is configured to implement the method 1400. According to another embodiment, the MAC processing 18 is also configured to implement at least a part of the method 1400. With continued reference to FIG. 1, in yet another embodiment, the method 1400 is implemented by the network interface 27 (e.g., the PHY processing unit 29 and/or the MAC processing unit 28) of the client station 25-1. In other embodiments, the method 1400 is implemented by other suitable network interfaces.

At block 1402, it is determined in which mode the NDP sounding packet is to be transmitted. If it is determined at block 1402 that the NDP sounding packet is to be transmitted in a normal PHY mode, then the NDP sounding packet is generated according to a first NDP sounding packet format at block 1404. In an embodiment, the NDP sounding packet is generated according to the format illustrated in FIG. 8A. In another embodiment, the NDP sounding packet is generated at block 1404 according to another suitable NDP sounding packet format. On the other hand, if it is determined at block 1402 that the NDP sounding packet is not to be transmitted in a normal PHY mode (i.e., the NDP sounding packet is to be transmitted in an extended range mode), then the NDP sounding packet is generated according to a second PHY sounding packet format at block 1406. In an embodiment, the NDP sounding packet at block 1406 is generated according to the PHY sounding packet format of FIG. 11. In another embodiment, the NDP sounding packet at block 1406 is generated according to another suitable PHY sounding packet format different form the first sounding data packet format used at block 1404.

At least some of the various blocks, operations, and techniques described above may be implemented utilizing hardware, a processor executing firmware instructions, a processor executing software instructions, or any combination thereof. Also, some of the various blocks, operations, and techniques may be performed in a different order (and/or concurrently) and still achieve desirable results. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method, comprising:
   determining, at a communication device, a physical layer (PHY) mode according to which a null data packet (NDP) is to be transmitted, the determined PHY mode from a set of PHY modes defined by a communication protocol, the set of PHY modes including i) a first PHY mode and ii) a second PHY mode, wherein the first PHY mode supports a lower data rate than a lowest data rate of the second PHY mode to improve receiver sensitivity as compared to the second PHY mode;
   when the communication device determines that the NDP is to be transmitted according to the first PHY mode, generating, at the communication device, the NDP according to a first PHY format, including generating a PHY preamble of the NDP according to a first preamble format;
   when the communication device determines that the NDP is to be transmitted according to the second PHY mode, generating, at the communication device, the NDP according to a second PHY format, including generating the PHY preamble of the NDP according to a second preamble format; and
   transmitting the NDP with the communication device.

2. The method of claim 1, wherein:
   the PHY preamble includes a short training field;
   the first PHY preamble format specifies a first duration of the short training field;
   the second PHY preamble format specifies a second duration of the short training field; and
   the second duration of the short training field is shorter than the first duration of the short training field.

3. The method of claim 2, wherein:
   the first duration of the short training field is 160 µs;
   the second duration of the short training field is 80 µs.

4. The method of claim 1, wherein:
   the PHY preamble includes a long training field;

the first PHY preamble format specifies a first duration of the long training field;
the second PHY preamble format specifies a second duration of the long training field; and
the second duration of the long training field is shorter than the first duration of the long training field.

5. The method of claim 1, wherein:
the NDP includes a signal field;
the first PHY format specifies a first duration of the signal field;
the second PHY format specifies a second duration of the signal field; and
the second duration of the signal field is shorter than the first duration of the signal field.

6. The method of claim 1, wherein:
the NDP includes a signal field;
the first PHY format specifies first content of the signal field;
the second PHY format specifies second content of the signal field; and
the second content includes information not included in the first content.

7. The method of claim 6, wherein:
the second PHY format specifies a subfield of the signal field that indicates a number of spatial streams; and
the first PHY format specifies that the signal field omits the subfield that indicates the number of spatial streams.

8. The method of claim 1, wherein:
the first PHY format specifies that the NDP packet is to be transmitted via only a single spatial stream; and
the second PHY format permits transmission of the NDP packet via multiple spatial streams.

9. The method of claim 1, wherein the first PHY mode corresponds to longer range transmissions as compared to the second PHY mode.

10. An apparatus comprising:
a network interface associated with a communication device, the network interface having one of more integrated circuits (ICs), wherein the one or more ICs are configured to determine a physical layer (PHY) mode according to which a null data packet (NDP) is to be transmitted, the determined PHY mode from a set of PHY modes defined by a communication protocol, the set of PHY modes including i) a first PHY mode corresponding and ii) a second PHY mode, wherein the first PHY mode supports a lower data rate than a lowest data rate of the second PHY mode to improve receiver sensitivity as compared to the second PHY mode;
a media access control layer (MAC) processor implemented on the one or more ICs;
a PHY processor implemented on the one or more ICs, wherein the PHY processor is configured to:
when the communication device determines that the NDP is to be transmitted according to the first PHY mode, generate the NDP according to a first PHY format, including generating a PHY preamble of the NDP according to a first preamble format,
when the communication device determines that the NDP is to be transmitted according to the second PHY mode, generate the NDP according to a second PHY format, including generating the PHY preamble of the NDP according to a second preamble format, and
cause the communication device to transmit the NDP.

11. The apparatus of claim 10, wherein:
the PHY preamble includes a short training field;
the first PHY preamble format specifies a first duration of the short training field;
the second PHY preamble format specifies a second duration of the short training field; and
the second duration of the short training field is shorter than the first duration of the short training field.

12. The apparatus of claim 11, wherein:
the first duration of the short training field is 160 µs;
the second duration of the short training field is 80 µs.

13. The apparatus of claim 10, wherein:
the PHY preamble includes a long training field;
the first PHY preamble format specifies a first duration of the long training field;
the second PHY preamble format specifies a second duration of the long training field; and
the second duration of the long training field is shorter than the first duration of the long training field.

14. The apparatus of claim 10, wherein:
the NDP includes a signal field;
the first PHY format specifies a first duration of the signal field;
the second PHY format specifies a second duration of the signal field; and
the second duration of the signal field is shorter than the first duration of the signal field.

15. The apparatus of claim 10, wherein:
the NDP includes a signal field;
the first PHY format specifies first content of the signal field;
the second PHY format specifies second content of the signal field; and
the second content includes information not included in the first content.

16. The apparatus of claim 15, wherein:
the second PHY format specifies a subfield of the signal field that indicates a number of spatial streams; and
the first PHY format specifies that the signal field omits the subfield that indicates the number of spatial streams.

17. The apparatus of claim 10, wherein:
the first PHY format specifies that the NDP packet is to be transmitted via only a single spatial stream; and
the second PHY format permits transmission of the NDP packet via multiple spatial streams.

18. The apparatus of claim 10, wherein the first PHY mode corresponds to longer range transmissions as compared to the second PHY mode.

19. The apparatus of claim 10, wherein:
the PHY processor includes one or more transceivers.

20. The apparatus of claim 19, further comprising:
one or more antennas coupled to the one or more transceivers.

21. A non-transitory, tangible computer readable medium, or media, storing machine readable instructions that, when executed by one or more processors of a communication device, cause the one or more processors to:
determine a physical layer (PHY) mode according to which a null data packet (NDP) is to be transmitted, the determined PHY mode from a set of PHY modes defined by a communication protocol, the set of PHY modes including i) a first PHY mode and ii) a second PHY mode, wherein the first PHY mode supports a lower data rate than a lowest data rate of the second PHY mode to improve receiver sensitivity as compared to the second PHY mode;
when the one or more processors determine that the NDP is to be transmitted according to the first PHY mode, generate the NDP according to a first PHY format, including generating a PHY preamble of the NDP according to a first preamble format;

when the one or more processors determine that the NDP is to be transmitted according to the second PHY mode, generate the NDP according to a second PHY format, including generating the PHY preamble of the NDP according to a second preamble format; and cause the communication device to transmit the NDP.

22. The computer readable medium, or media, of claim 21, wherein:
the PHY preamble includes a short training field;
the first PHY preamble format specifies a first duration of the short training field;
the second PHY preamble format specifies a second duration of the short training field; and
the second duration of the short training field is shorter than the first duration of the short training field.

23. The computer readable medium, or media, of claim 22, wherein:
the first duration of the short training field is 160 µs;
the second duration of the short training field is 80 µs.

24. The computer readable medium, or media, of claim 21, wherein:
the NDP includes a signal field;
the first PHY format specifies a first duration of the signal field;
the second PHY format specifies a second duration of the signal field; and
the second duration of the signal field is shorter than the first duration of the signal field.

25. The computer readable medium, or media, of claim 21, wherein:
the NDP includes a signal field;
the first PHY format specifies first content of the signal field;
the second PHY format specifies second content of the signal field; and
the second content includes information not included in the first content.

26. The computer readable medium, or media, of claim 25, wherein:
the second PHY format specifies a subfield of the signal field that indicates a number of spatial streams; and
the first PHY format specifies that the signal field omits the subfield that indicates the number of spatial streams.

27. The computer readable medium, or media, of claim 21, wherein:
the first PHY format specifies that the NDP packet is to be transmitted via only a single spatial stream; and
the second PHY format permits transmission of the NDP packet via multiple spatial streams.

* * * * *